June 4, 1968  R. M. HEDRICK ET AL  3,386,943
PROCESS FOR POLYMERIZING LACTAMS IN THE PRESENCE
OF FILLER OR REINFORCING AGENT
Filed Nov. 24, 1964  2 Sheets-Sheet 1

INVENTORS
ROSS M. HEDRICK,
PAUL A. TIERNEY,
WILLIAM R. RICHARD, JR.
BY
*Robert E. Hartenberger*
ATTORNEY June 4, 1968  R. M. HEDRICK ET AL  3,386,943
PROCESS FOR POLYMERIZING LACTAMS IN THE PRESENCE
OF FILLER OR REINFORCING AGENT
Filed Nov. 24, 1964  2 Sheets-Sheet 2

INVENTORS
ROSS M. HEDRICK,
PAUL A. TIERNEY,
WILLIAM R. RICHARD, JR.
BY
Robert E. Hartenberger
ATTORNEY

United States Patent Office 3,386,943
Patented June 4, 1968

3,386,943
PROCESS FOR POLYMERIZING LACTAMS IN THE PRESENCE OF FILLER OR REINFORCING AGENT
Ross M. Hedrick and Paul A. Tierney, St. Louis, and William R. Richard, Jr., Kirkwood, Mo., assignors to Monsanto Company, St. Louis, Mo., a corporation of Delaware
Filed Nov. 24, 1964, Ser. No. 413,456
12 Claims. (Cl. 260—37)

This invention relates to a method for polymerizing lactams in the presence of a filler or reinforcing agent. One important aspect of this improved method comprises treating the surface of a filler or reinforcing agent in such a manner as to prevent its surface from inhibiting the base-catalyzed, substantially anhydrous polymerization of a lactam when the filler or reinforcing agent is in the presence of the polymerizing monomer.

The base-catalyzed, substantially anhydrous polymerization of lactams is well known to those skilled in the art. The patent art contains several disclosures relating to base-catalyzed lactam polymerizations. Among them are U.S. 3,017,391, U.S. 3,017,392, U.S. 3,018,273, U.S. 3,028,369, U.S. 3,086,962 and U.S 3,120,503.

The above references disclose various catalysts, initiators or promoters, regulators, and reaction conditions for carrying out a base-catalyzed lactam polymerization. In addition, all the above references recognize the necessity of maintaining substantially anhydrous conditions during the base-catalyzed polymerization. In instances where appreciable amounts of water are present, e.g. because of the use of alkali metal hydroxide catalysts or because of incompletely dried lactam monomer, the water is removed before contact of the catalyst with the initiator, The removal of water is usually accomplished by heating a monomer-catalyst mixture or a monomer-initiator mixture to 100 or 200° C., optionally under reduced pressure, and distilling off the objectionable water.

Prior to and concurrent with the development and improvement of the base-catalyzed lactam polymerization, an independent body of polymer technology, namely the filling and reinforcement of polymer systems, has been developed over a period of several years. Some of the earliest significant developments in this area include the addition of carbon black to natural and synthetic rubbers to improve the physical properties of the rubbers. Other developments include the filling and reinforcement of plastic floor tile with clays and with asbestos fibers and the filling of numerous other polymeric products with clays as well as with cellulosic materials such as cotton flock, wood fibers and sawdust. An important filler for modifying various polymeric products is glass fiber form. Glass fibers have been incorporated into a number of resins, notably the polyesters, in several different ways depending upon the characteristics of the resin. In addition to the polyesters, polyamides have also been filled with a variety of substances, among them glass fibers, clays and asbestos fibers. Different polyamides which have been filled in this manner include the polylactams such as polypyrrolidone and polycaprolactam (nylon 6) as well as other polyamides such as polyhexamethyleneadipamide (nylon 6, 6). In many instances, the filler has been mixed with the molten polymer and the resultant composition subjected to any of several molding operations. It has also been advantageous to add the filler to the monomer system before polymerization for various reasons such as increased dispersion or ease of incorporation of the filler. Such a technique has in fact been adopted for many polyamide polymerizations and has worked successfully. Several nylon 6,6-glass fiber reinforced compositions have been prepared in this manner as have several polylactam compositions.

Difficulty is experienced, however, in conducting a base-catalyzed, substantially anhydrous lactam polymerization in the presence of an appreciable amount of filler or fiber reinforcement. The polymerization is inhibited to some degree and can be stopped altogether, depending on the type and quantity of filler present. The polymer obtained is often of irregular molecular weight and is obtained in low yields. The above problems are attributed to the presence of hydroxyl groups attached to the filler surface as well as water molecules physically adsorbed thereon. If the amount of filler in the monomer system is small, e.g. about 15% or less by weight of the total monomer system, the adverse effects may be imperceptible or at least not so pronounced as to cause serious difficulty. Much depends also on the type of filler used; for example, hydrated lime will inhibit the polymerization considerably more than finely divided steel whiskers. Another contributing factor is the particle size of the filler—the smaller the particle size, the greater the exposed surface containing inhibiting hydroxyl groups.

Recent developments combining the two above-mentioned fields of technology, base-catalyzed lactam polymerizations and filled and reinforced polymer systems, have made it advantageous to be able to conduct a base-catalyzed lactam polymerization in the presence of large quantities of filler or reinforcing agent. U.S. patent application Serial No. 284,375, filed May 31, 1963, by R. M. Hedrick and W. R. Richard describes several compositions and techniques for preparing polylactam polymerizations of outstanding mechanical properties. It should be noted regarding the above application first, that certain reactive silanes were added to the monomer-mineral slurries; secondly, that neither the catalyst nor the initiator were in contact with the inorganic phase for a prolonged period of time prior to polymerization; and finally that the catalyzed slurries were cured for one hour after the onset of polymerization. From an economic standpoint, it would be desirable to reduce the total cure time for a reinforced polylactam to 15 minutes or less. Further, in the production of large quantities of reinforced polylactams, it is usually advantageous to prepare a catalyzed, uninitiated monomer-inorganic slurry or an initiated, uncatalyzed monomer-inorganic slurry, hold the slurry at polymerization temperature for some indefinite time, and then add the missing initiator or catalyst to start the polymerization when convenient. It has heretofore been impossible to prepare acceptable castings utilizing short cure times of about 15 minutes or less after the initiator or the catalyst has been in contact with the inorganic phase for several minutes prior to casting. In addition, varying degrees of difficulty have been experienced in carrying out any base-catalyzed, substantially anhydrous lactam polymerization in the presence of certain inorganic materials.

It is a primary object of the present invention to provide a method for conducting a base-catalyzed, substantially anhydrous lactam polymerization in the presence of certain inorganic materials having surface hydroxyl groups. It is a further object of this invention to provide a method for treating the surface of certain inorganic materials so that they can be placed in the presence of a polymerizing lactam without adversely affecting the base-catalyzed polymerization. Additional objects, benefits and advantages will become apparent as the detailed description of the invention proceeds.

To more fully understand the invention, reference should be taken to the accompanying drawings in which.

Figure 1:
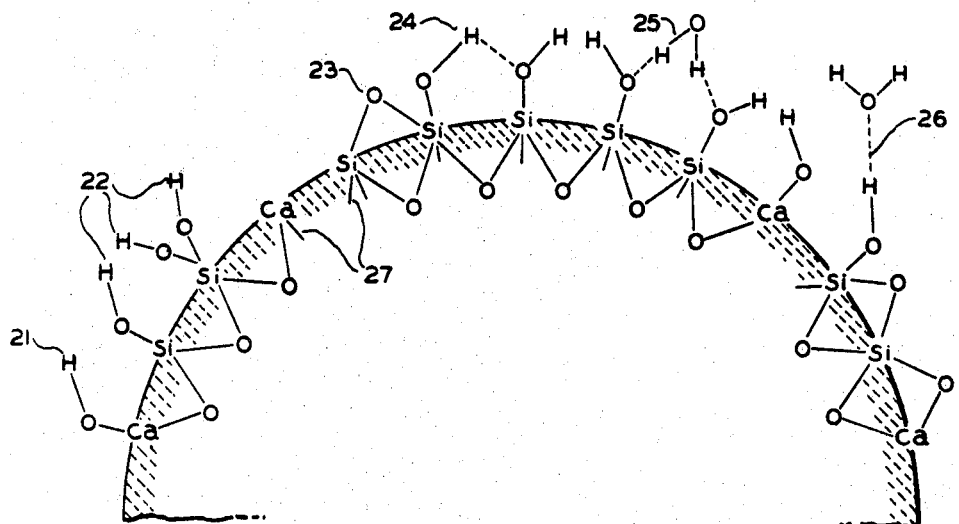
FIGURE 1 is a representation of the untreated surface of a siliceous mineral wollastonite.
Figure 3:
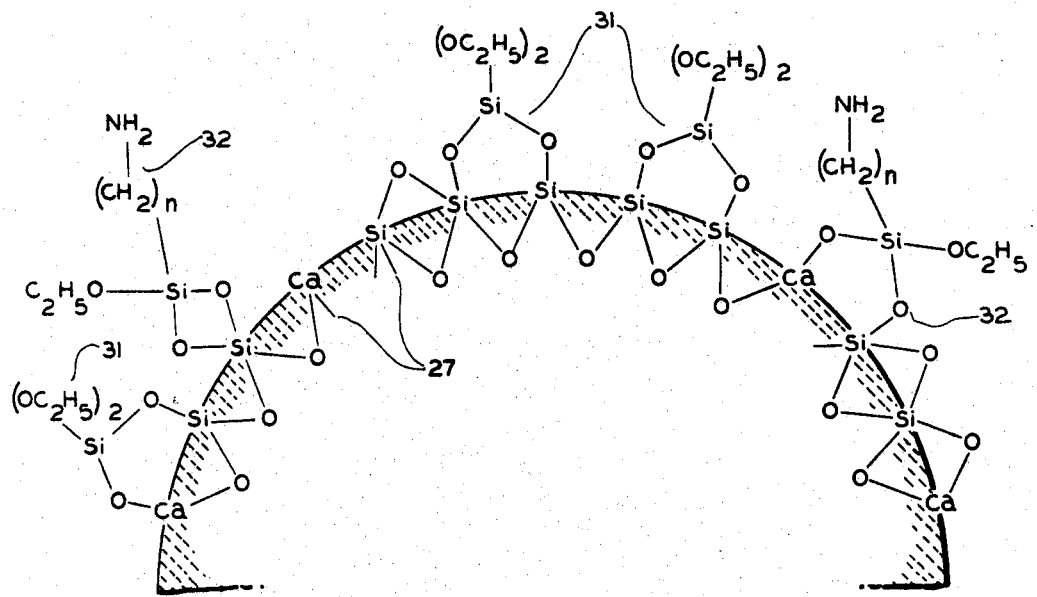
Figure 4:
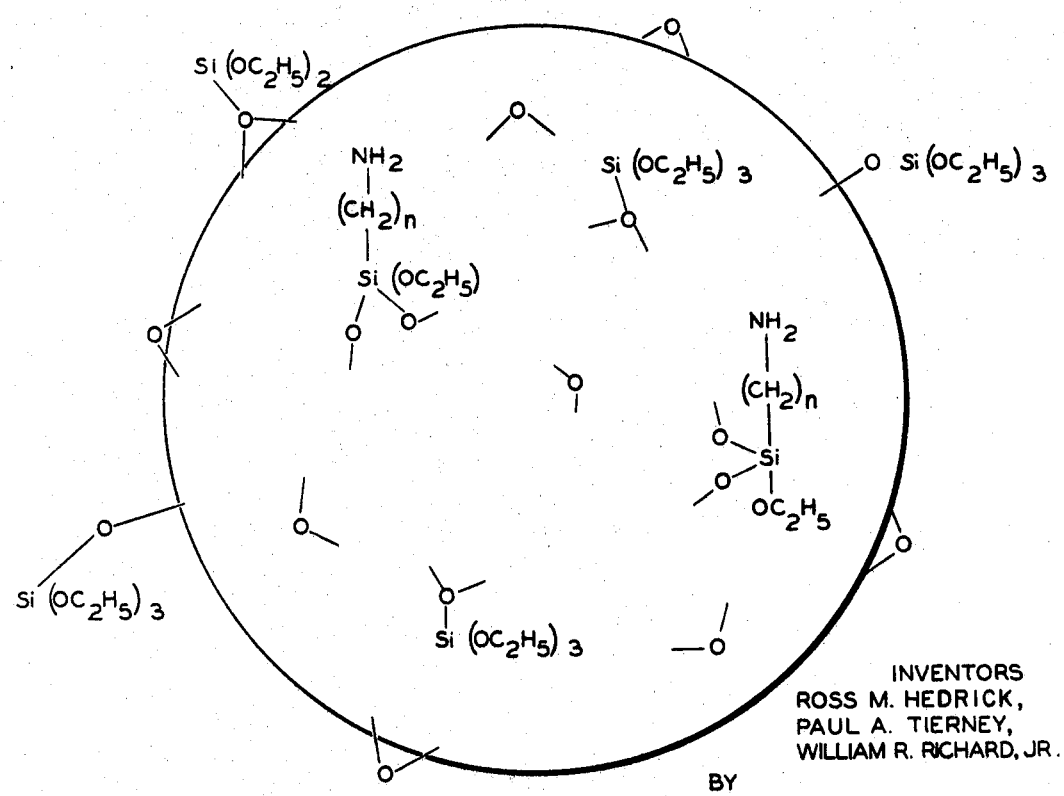

FIGURE 3 is a representation of the surface of FIGURE 1 treated in such a manner as to render it suitable for coupling to a polylactam and innocuous to the base-catalyzed polymerization; and FIGURE 4 is a perspective view of the treated surface of a siliceous mineral showing the modified groups attached thereto which render the mineral suitable for coupling to a polylactam and innocuous to the base-catalyzed polymerization.

In its broadest aspects, the present invention comprises treating the surface of a filler or reinforcing agent to remove surface hydroxyl groups prior to conducting a base-catalyzed, substantially anhydrous lactam polymerization in the presence of the filler or reinforcing agent.

The term "reinforcing agent" refers to those inorganic materials capable of being incorporated into a polymer system whenever their incorporation is accompanied by a coupling agent which provides the linkage for the consequent bonding of the polymer and inorganic material. This is in contrast to a "filler" which is not bonded to a polymer through a coupling agent. A coupling agent is a compound capable of bonding an inorganic material to a polymer. This is accomplished by polyfunctional compounds having at least one group capable of reaction with the monomer during polymerization and at least one group capable of reaction with the inorganic material. The term "inorganic material" or simply "inorganic" used in this disclosure refers to materials which are inorganic in nature and which fall within the general classification of fillers or reinforcing agents for polymer systems.

Many of the commonly used fillers and reinforcing agents for resinous compositions have hydroxyl groups attached to their surfaces either in the form of covalent, chemically bound hydroxyl groups, or in the form of physically adsorbed or absorbed water. Reinforcing agents having hydroxyl-bearing surfaces can be selected from a wide variety of inorganic materials having a water solubility of 0.15 grams per liter or less. Examples include limestone, mica, montmorillonite, kaolinite, bentonite, hectorite, beidellite, attapulgite, chrysolite, alumina, saponite, hercynite, aluminum, tin, lead, magnesium, calcium, strontium, barium, titanium, zirconium, vanadium, chromium, manganese, iron, cobalt, nickel, copper, zinc, metal oxides such as oxides of the foregoing metals, and metal salts such as heavy metal phosphates, sulfides, and sulfates and metal aluminates such as iron aluminate and zinc aluminate. Preferred for use herein are the inorganic materials such as exemplified above. Particularly preferred are those inorganic siliceous materials which have or can acquire an alkaline surface upon treatment with a base and which have a 3-dimensional silicate crystal structure as opposed to a 2-dimensional or planar crystal configuration. Particularly preferred siliceous materials are also characterized by a somewhat refractory nature with a melting point above 800° C., a Moh's hardness of at least 4, and a water solubility of less than 0.1 gram per liter. Examples of particularly preferred siliceous materials include minerals such as feldspar, quartz, wollastonite, mullite, kyanite, chrysolite, cristobalite, crocidolite, fibrous aluminum silicate having the formula Al₂SiO₅, spodumene, and garnet. Additional preferred siliceous materials include synthetically prepared materials such as glass fibers, silica gel and fume silica. A preferred reinforcing mixture, therefore, is one which contains a major amount, i.e., more than 50% by weight, of the preferred siliceous materials exemplified above.

The amount of reinforcing agent which can be used to prepare the modified polylactams described herein can vary widely from about 1 to about 90% by weight of the total composition; preferred compositions are prepared using quantities of reinforcing agent ranging from about 50 to 90% by weight. As previously suggested, increased inhibition of the base-catalyzed polymerization is experienced at the higher levels of reinforcing agent.

Particle size of the inorganic reinforcement also affects the degree of polymerization inhibition. For example, 65% by weight of a reinforcing agent having an average particle size of 2 microns will inhibit a base-catalyzed lactam polymerization considerably more than an equal amount of reinforcement with an average particle size of 1000 microns. Generally, the particle size of the reinforcement can vary from about 200 or 400 mμ up to particles having a diameter of one inch or more. Preferred are mixtures of particle sizes which can be as large as 500μ and as small as 0.5μ. A typical preferred size distribution used for many compositions is as follows:

| | Percent |
|---|---|
| 74μ or less (200 mesh) | 100 |
| 44μ or less (325 mesh) | 90 |
| 11μ or less | 50 |
| 1μ or less | 10 |

The type of reinforcing agent is also a significant factor in determining the degree of polymerization inhibition. Cetrain materials such as feldspar are likely to have less surface hydroxyl groups present thereon than a material such as steel filings or whiskers.

Fillers are also useful in the practice of the present invention. The term "filler" refers to those materials incorporated into a polymer, which materials function merely as extenders and contribute little or nothing to the improvement of mechanical properties, particularly at concentrations of 50% by weight or more. Like the reinforcing agents, the amount of filler to be used in the preparation of polymeric compositions can vary widely. Generally, less granular particulate filler than a similarly shaped particulate reinforcing agent can be used in a polymeric composition. This is because a filler in a polymer is not a component comparable to the polymer in load-bearing characteristics. Rather the polymeric constituent is primarily determinative of the tensile and flexural strengths and moduli of the composition. Therefore, a very large amount of filler in a polymeric composition, when not treated with a coupler to convert it to a reinforcing agent, results in mechanically weak and brittle compositions. If on the other hand, the filler is fibrous in nature, the upper limit of filler is established not by the degree of loss of mechanical properties of the composition since mechanical properties often will be increased, but rather by the increased viscosity of the monomer-filler slurry. A preferred range of filler concentration is from about 40% to about 65% by weight although this preferred range is subject to wide variation depending upon the specific filler selected and the mechanical properties desired in the finished product. Particle sizes and size distributions for fillers are comparable to the ranges set forth in the discussion of reinforcing agents. In addition to those inorganics suitable for use as reinforcing agents various organic substances can also be used as fillers. Examples include wood fibers, sawdust, wood flour, keratin, jute, sisal and cotton flock.

The polylactams useful in preparing reinforced shapes are those resins derived from lactam monomers of the formula

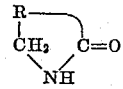

where R is an alkylene radical containing at least 2 carbon atoms and preferably not more than 11 carbon atoms. A preferred monomer is ε-caprolactam. Lactam monomers in addition to ε-caprolactam include α-pyrrolidone, piperidone, γ-butyrolactam, δ-valerolactam, caprolactams other than the ε-isomer, methylcyclohexanone isoximes, enantholactam, caprylolactam, nonanolactam, capryllactam, dodecanolactam and cyclododecanone isoxime.

Base-catalyzed, substantially anhydrous lactam polymerizations are well known in the art and full discussions of the polymerization can be found in U.S. 3,017,391, U.S. 3,017,392, U.S. 3,018,273, U.S. 3,028,369, U.S. 3,086,962 and U.S. 3,120,503, hereby incorporated by reference. Other references disclosing additional catalysts and initiators are also available.

Basic lactam polymerization catalysts are any of the metals in metallic, complex ion, or compound form, which are capable of forming acids in the "Lewis acid" sense sufficiently strong to form an iminium salt of the lactam being polymerized. The iminium salt, for example sodium caprolactam, is the active catalyst of the present base-catalyzed polymerization system. Common examples of catalysts are the alkali and alkaline earth metals such as sodium, potassium, lithium, calcium, strontium, barium, magnesium, etc., either in metallic form or in the form of hydrides, borohydrides, oxides, hydroxides and carbonates. In the case of compounds such as the hydroxides and carbonates which give off water when reacted with lactams, the bulk of such water must be removed from the polymerization system before the base-catalyzed polymerization can take place. Other effective catalysts are the organometallic derivatives of the foregoing metals as well as of other metals. Examples of such organometallic compounds are the lithium, potassium and sodium alkyls, such as butyl lithium, ethyl potassium, or propyl sodium, or the aryl compounds of such metals such as sodium phenyl. Other suitable organometallic compounds are diphenyl magnesium, zinc diethyl, triisopropyl aluminum, and isobutyl aluminum hydride. As a general class, materials known as Grignard reagents are effective catalysts for the present polymerization. Typical Grignard catalysts include lower alkyl magnesium halides wherein the alkyl group can have up to six carbon atoms such as ethylmagnesium bromide and methylmagnesium chloride. Phenylmagnesium bromide is also an effective Grignard catalyst. Other suitable catalysts are sodium amide, magnesium amide, magnesium anilide, magnesium caprolactam, magnesium ethylate and the reaction product of a Grignard reagent with an alcohol or a primary or secondary amine.

The present polymerization of lactams is generally carried out with a catalyst concentration ranging anywhere from a small fraction of 1%, e.g., 0.01%, to as much as 15 or 20 mole percent, based upon the quantity of monomer to be polymerized. In general, preferred catalyst concentrations fall between about 0.1 mole percent and about 1 percent of lactam monomer.

Lactam polymerization initiators (promoters) useful herein are as described in U.S. 3,017,391, U.S. 3,017,392, U.S. 3,018,273, U.S. 2,061,592, U.S. 3,086,962, and U.S. 3,120,503. Particularly preferred are the isocyanate compounds set forth in U.S. 3,028,369. Other useful initiators include N-acetylcaprolactam, N-benzoylvalerolactam, N,N'-di(phenylcarbamyl)-N,N' - dimethylurea, ethylene disuccinimide, cyanuric chloride, diisopropyl-carbodiimide, N,N-dicyclohexyl-cyanamide, triacetamide, N,N-dibenzoylaniline, N-acetyl-N-ethyl-p-toluenesulfonamide, N,N - di(p - toluenesulfonyl)anilide, N-nitroso-2-pyrrolidone, N-nitroso-N-methylbenzenesulfonamide, N - (dimethylphosphinyl) ε-caprolactam and corresponding thioacyl compounds such as N-thiopropionylmaleimide and N-(dimethylthiophosphinyl)-ε-caprolactam. It will be recognized that the term "initiator" or "promoter" has been applied both to the true N-acyl initiators and to those compounds which will acylate a lactam monomer to form an N-acyl lactam initiator.

The concentration of the promoter should be between about 0.1 mole percent to about 5 mole percent based upon the lactam being polymerized. The most effective concentration range lies between about 0.5 mole percent and about 2 mole percent of the lactam, although concentrations outside these ranges can also be used in certain circumstances such as in the synthesis of an unusually low molecular weight polymer.

Referring now to FIGURE 1, it can be seen that a typical inorganic mineral, wollastonite, preferred for use both as a filler and as a reinforcing agent has hydroxyl groups attached to its surface in a number of ways, in the form of (a) Alkali metal hydroxyl groups 21,
(b) Silanol groups 22,
(c) Hydrogen bonded vicinal silanol groups 24, and
(d) Physically adsorbed water molecules 25 and 26.

Also present on the surface are a number of siloxane groups 23.

Figure 2:
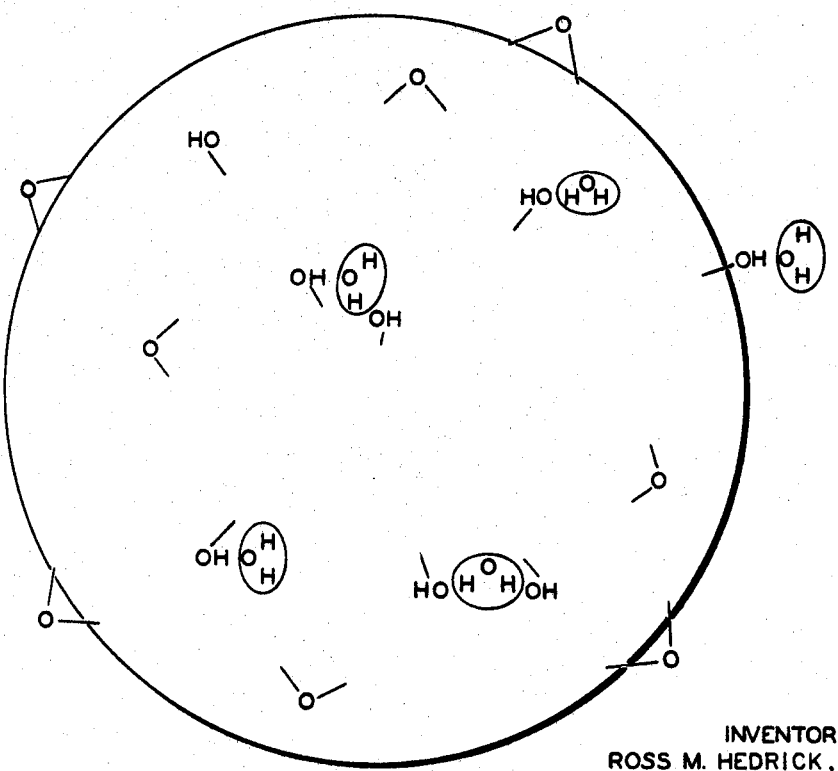
FIGURE 2 is a representation of the untreated surface of a siliceous mineral showing some of various groups attached thereto.

FIGURE 2 is a representation of the surface of an inorganic material showing only the innocuous

groups and the polymerization-inhibiting hydroxyl groups. Heating the materials shown in FIGURES 1 and 2 at 100 or 200° C. for a prolonged time does not substantially alter their surfaces. Several techniques have been devised, however, for altering the character of filler or reinforcing agent surfaces to render them non-inhibiting to a lactam polymerization.

One technique comprises pretreating the filler or reinforcing agent at temperatures at or above about 400° C. Minimum time and temperature requirements for effective pretreatment are interrelated. That is, the time requirement can vary considerably depending upon the temperature selected for treatment. Generally, temperatures substantially below 400° C., e.g. below about 375° C., are inadequate to remove a substantial number of hydroxyl groups. Temperatures substantially in excess of 1200° C. are also unsuitable because such temperatures are capable of changing the composition of some inorganics, e.g. by volatilization of $SiO_2$, etc.; other compositions may be fused or converted to glasses. A preferred temperature range is from about 400° C. to about 1000° C. For temperatures within this range, a two hour exposure time is sufficient to achieve the benefits of this invention. Moreover, at the higher temperatures, the treatment time can be reduced considerably. For instance, heat treatment of inorganic material at 1000° C. for ten minutes is also satisfactory. Depending upon other factors such as exposure of the inorganic to heat and heating under reduced pressure, it is also possible to heat-pretreat an inorganic effectively at 400° C. for a short time. Preferred heat treatment, then, consists of heating the inorganic to a temperature of from about 400° C. to about 1000° C. for about 2 hours or less, depending upon the particular temperature selected and upon other factors such as exposure to the heat source and means for removal of formed water vapor.

Obviously such a technique is not preferred for use with cellulosic fillers. Usually cellulosic material can be modified satisfactorily by heating them at 100 to 200° C. for an hour or two.

A second technique for treating fillers or reinforcing agents comprises using a sufficiently large quantity of initiator to permit reaction of the initiator with the inorganic surface as well as to provide enough initiator left over to promote the lactam polymerization. It will be recognized that some initiators upon reaction with an inorganic surface will form reaction products harmful to the lactam polymerization. As an example, acetyl caprolactam yields caprolactam plus acetic acid. Acetic acid inhibits the base-catalyzed lactam polymerization. Most of such harmful reaction products can be removed by vacuum distillation prior to introduction of the catalyst. A class of initiators which function very satisfactorily as an inorganic drying agent and are particularly preferred because of the easily removable reaction products are the isocyanates, which form carbon dioxide upon reaction with water. A typical satisfactory procedure is as follows: the inorganic, lactam monomer, optionally other additives such as couplers, stabilizers, etc., and polymerization initiator are mixed thoroughly and heated to about 100° C. under reduced pressure. The slurry is then held in a tank at 100° C. until a mold is available, at which time a measured amount of catalyst is mixed into the slurry before it is poured into the mold. The amount of the catalyst can be varied, depending on whether or not harmful initiator-inorganic reaction products still remain in the slurry.

A further improvement of facilitating the removal of hydroxyl groups from the surface of a filler or reinforcing agent comprises catalyzing the reaction of the initiator with surface hydroxyl groups. This can be done by the addition of a substance recognized as an effective catalyst in the production of polyurethanes, i.e. an effective catalyst for the reaction of a di- or polyisocyanate with a di- or polyol. Preferably, these materials are electron-donating substances having no active hydrogen atoms. More preferably, the polyurethane catalyst is of such a basicity that the lactam monomer is not polymerized by contact therewith at temperatures below 200° C. However, substances which will catalyze a polyurethane polymerization as well as a polylactam polymerization below 200° C. can nevertheless be used herein if the temperature of the lactam monomer slurry is reduced to a temperature sufficient to prevent the lactam polymerization but adequate to permit the initiator-hydroxyl reaction. Examples of preferred compounds include tertiary amines, organometallics and metallic salts of tin, lead, bismuth, antimony, sodium, potassium, lithium, titanium, iron, uranium, cadmium, cobalt, thorium, aluminum, mercury, zinc, nickel, cerium, molybdenum, vanadium, copper, manganese, and zirconium. As illustrative examples of organometallics and metal salts, the following compounds are mentioned—bismuth nitrate, lead 2-ethylhexoate, lead benzoate, lead oleate, sodium trichlorophenate, sodium propionate, lithium acetate, potassium oleate, dibutyltin dichloride, butyltin trichloride, stannic chloride, tributyl tin o-phenylphenate, tributyltin cyanate, stannous octoate, stannous oleate, dibutyltin di(2-ethyl-hexoate), dibutyltin dilaurate, dibutyltin diisooctylmaleate, dibutyltin sulfide, dibutyltin dibutoxide, dibutyltin bis(o-phenylphenate), dibutyltin bis(acetylacetonate), and di(2-ethylhexyl)tin oxide, titanium tetrachloride, dibutyltitanium dichloride, tetrabutyl titanate, butoxytitanium trichloride, ferric chloride, ferric 2-ethylhexoate, ferric acetylacetonate, antimony trichloride, antimony pentachloride, triphenylantimony dichloride, uranyl nitrate, cadmium nitrate, cadmium diethyldithiophosphate, cobalt benzoate, cobalt 2-ethylhexoate, thorium nitrate, triphenylaluminum, trioctylaluminum, aluminum oleate, diphenyl mercury, zinc 2-ethylhexoate, zinc naphthenate, nickelocene, molybdenum hexacarbonyl, cerium nitrate, vanadium trichloride, cupric 2-ethylhexoate, cupric acetate, manganese 2-ethylhexoate, maganese linoresinate, zirconium 2-ethylhexoate, and zirconium naphthenate.

Examples of tertiary amines include 1-methyl-4-(dimethylaminoethyl)piperazine, N-ethylethylenimine, tetramethylethylenediamine, triethylenediamine, triethylamine, 2,4,6-tri(dimethylaminomethyl)phenol, N - ethylmorpholine, nicotine, and α-methylbenzyldimethylamine.

Particularly preferred are the tertiary amines, the salts of tin, lead, bismuth and iron, and mixtures of tertiary amines with salts of tin, lead, bismuth, and iron.

U.S. Patent 2,888,437 teaches the use of magnesium oxide and barium oxide as useful polyurethane catalysts. The patent also teaches that other metal oxides such as calcium oxide are not suitable for use therein. Other patent and literature references both include and exclude various additional compounds as polyurethane catalysts. It is our intent to limit the present invention to those compounds which have been and will be described as, or which are obvious to those skilled in the art as, suitable catalysts for prolyurethane polymerizations and to exclude from the scope of the present invention those compounds which are unsuitable catalysts.

The concentration of polyurethane catalyst required to produce void-free lactam castings depends upon the particular reinforcing agent or filler employed, the concentration of lactam monomer, the concentration and type of initiator, and lastly the polyurethane catalyst itself. In general, the concentration of polyurethane catalyst can range from about one-tenth to about ten times the amount on an equivalent basis of the initiator used. A preferred range suitable when using a preferred polyurethane catalyst in conjunction with an aromatic mono- or polyisocyanate is from about one third to about three molecular equivalents of polyurethane catalyst for each molecular equivalent of isocyanate initiator used.

The technique is particularly well suited for use with an isocyanate initiator. When an isocyanate reacts with hydroxyl radicals, the reaction progresses to a point short of evolution of carbon dioxide. Upon subsequent addition of a basic lactam polymerization catalyst, carbon dioxide is evolved and trapped within the polymerizing lactam, producing a finished casting with numerous voids and bubbles and consequent poor mechanical properties. If, however, a material is added which causes the carbon dioxide to be removed prior to the addition of the basic lactam polymerization catalyst, the carbon dioxide can be completely removed, permitting the production of a smooth, void-free casting of excellent mechanical properties.

The problem of bubbles in the monomer slurry with resultant voids in the cast product becomes most troublesome when the molten monomer-inorganic-initiator slurry is held for an extended period of time at an elevated temperature, e.g. one or more hours at 75° C. or higher. If, after a lengthy holding period at an elevated temperature, the monomer-inorganic-initiator slurry is contacted with a lactam polymerization catalyst, evolution of gas takes place as the polymerization proceeds to completion, thereby creating voids in the finished product. Elimination of gas evolution at the time of polymerization is accomplished most effectively by addition of a polyurethane catalyst to the monomer-inorganic-isocyanate slurry after the slurry has been held at elevated temperatures and before the lactam polymerization catalyst has been added. Addition of the polyurethane catalyst causes the evolution of gas from the monomer slurry without catalyzing the lactam polymerization. Upon subsequent addition of the lactam polymerization catalyst, the slurry is polymerized in the absence of gas evolution and a polymerized product, free from voids and open spaces, is produced. Other orders of addition of the slurry components prior to addition of the lactam polymerization catalyst are of course possible.

Another technique for treating fillers or reinforcing agents comprises reacting a lactam polymerization catalyst with the surface of an inorganic. This is accomplished in a manner similar to the initiator treatment of an inorganic. That is, a monomer-catalyst-inorganic slurry is heated under vacuum prior to the addition of initiator. The amount of initiator used is varied, depending upon the presence or absence of polymerization-inhibiting reaction products.

Another means of treating a filler or reinforcing agent surface to remove objectionable hydroxyl groups is to react some of the hydroxyl groups with coupling agents. Preferred coupling agents for bonding reinforcing agents to polylactams are compounds of the formula

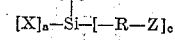

where X is an inorganic-reactive group, Y is a non-reactive group, Z is a group capable of incorporation into a growing polylactam chain, R is an alkylene or alkenylene chain of from 2 to about 20 carbon atoms, $a$ is an integer from 1 to 3, $b$ is an integer from 0 to 2, $c$ is an integer from 1 to 3, and the sum of $a+b+c$ is 4. Examples of X in the above formula include halogen, hydoxy, and alkoxy groups having from 1 to 6 carbon atoms; suitable examples for Y are hydrogen and hydrocarbyl radicals, preferably alkyl radicals having up to 10 carbon atoms, which are reactive with neither the surface of the inorganic material nor with the polymerizing monomer; examples of Z include alkoxycarbonyl, primary and secondary amino, secondary amido, epoxy, isocyanato, and hydroxy groups. Illustrative compounds include the following:

3-aminopropyltriethoxysilane, $(C_2H_5O)_3SiC_3H_6NH_2$;
ethyl 11-triethoxysilylundecanoate, $(C_2H_5O)_3SiC_{10}H_{20}COOC_2H_5$;

4-aminobutylmethyldichlorosilane, $(Cl)_2CH_3SiC_4H_8NH_2$;
methyl 3-methyldifluorosilylacrylate, $(F)_2CH_3SiCH=CHCOOCH_3$;

3,4-epoxybutyltri-n-butoxysilane,

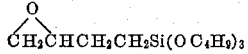

N-(β-aminoethyl)-3-aminopropyltrimethoxysilane, $NH_2CH_2CH_2NHC_3H_6Si(OCH_3)_3$;

10-trihydroxydecyl tribromosilane, $HOC_{10}H_{20}Si(Br)_3$;
18-triiodosilylstearyl isocyanate, $OCNC_{18}H_{36}Si(I)_3$; and
3-carbamoylpropyltriethoxysilane, $NH_2C(O)C_3H_6Si(OC_2H_5)_3$.

Another class of coupling agents are the phosphorous-based coupling agents of the formula:

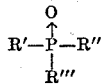

where R' is an inorganic-reactive group equivalent to the X group of the silane compounds, R" is the polymer-reactive group equivalent to the Z group of the silane compounds, and R''' is either a non-reactive group equivalent to the Y group of the silane compound or is equivalent to the R' or R" group of the instant compounds. Illustrative compounds include:

diethyl ethylundecanatophosphonate, $(C_2H_5O)_2P(O)C_{10}H_{20}COOC_2H_5$;

methylphosphonamidic chloride, $CH_3P(O)ClNH_2$;
phosphorisocyanatidodichloridic acid, $(Cl)_2P(O)NCO$;
dimethyl(2,3-epoxypropyl)phosphonate,

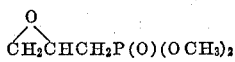

dicarbethoxyphosphinic acid, $(C_2H_5OOC)_2P(O)OH$;
sodium phosphorodiamidate, $(NH_2)_2P(O)(ONa)$;
dimethyl ureidophosphoric acid, $(CH_3O)_2P(O)NHC(O)NH_2$; and diethyl γ-aminopropylphosphonate, $(C_2H_5O)_2P(O)C_3H_6NH_2$.

Additional compounds suitable for use herein will become obvious upon reference to copending U.S. patent application Serial No. 333,630, filed December 26, 1963.

Other compounds useful as couplers include primary and secondary amino, secondary amido, epoxy, isocyanato, hydroxy and alkoxycarbonyl-containing Werner complexes such as ε-amino caprotachromic chloride, isocyanatochromic chloride, resorcylatochromic chloride, crotonatochromic chloride, sorbatochromic chloride, and 3,4-epoxybutylchromic chloride.

Several methods of treating an inorganic surface with a coupler are suitable. The coupler and inorganic material can be mixed together separately or in the presence of a solvent such as water, alcohol, benzene, dioxane, or molten lactam, thereby effecting a coupler-inorganic bond. The treated inorganic can then be dried and stored for future use, or used immediately in conjunction with a catalyzed monomeric lactam system. Alternatively, molten lactam, coupler, inorganic material, dispersing agents, initiator and finally catalyst can all be mixed together and polymerized in situ.

Completely effective treatment of an inorganic surface cannot be achieved, however, solely by the use of coupling agents. This is because a coupling agent has at least one polymer-reactive group per molecule. The inorganic materials preferred as reinforcing agents all have such quantities of surface hydroxyl groups that complete removal of such groups would require significantly larger quantities of coupler than the 2 to 20 grams per 1000 grams of reinforcing agent usually employed. These large quantities of coupler would also provide a large amount of polymer-reactive groups such as amino or alkoxycarbonyl groups which could have a detrimental effect on the polymerization. It is well known, for instance, that amino groups act as a regulator in a lactam polymerization. An unduly large quantity of amino groups would produce polylactams of unusually low molecular weight, thereby limiting their usefulness.

The most preferred method devised for removing hydroxyl groups from an inorganic surface comprises reacting these groups with certain organometallic compounds which do not yield polymerization-inhibiting groups. A suitable class of compounds have the general formula

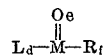

where L is hydrogen, alkyl or an alkoxy radical having up to 6 carbon atoms, M is any element except the inert gases, the halogens, carbon, nitrogen, and oxygen, R is any hydrocarbon radical, d is at least 1 and the sum of $d+2e+f$ equals the valence bonds available on the M atom. Examples include tetraethyl silicate, $(C_2H_5O)_4Si$;
trimethoxyoctadecylsilane, $(CH_3O)_3SiC_{18}H_{37}$;
trimethoxyallylsilane, $(CH_3O)_3SiCH_2CH=CH_2$;
diethoxydicetylsilane, $(C_2H_5O)_2Si(C_{16}H_{33})_2$;
aluminum triisopropoxide, $(i-C_3H_7O)_3Al$;
aluminum ethoxide, $Al(OC_2H_5)_3$;
aluminum tert-butylate, $Al(OC_4H_9)_3$;
dibutyl stannate, $Sn(OC_4H_9)_2$;
tetrabutyl tin, $Sn(C_4H_9)_4$;
trimethylphosphate, $(CH_3O)_3P(O)$;
triethyl phosphite, $(C_2H_5O)_3P$;
triphenyl phosphate, $(C_6H_5O)_3P(O)$;
methyl borate, $(CH_3O)_3B$;
tetrabutyl titanate, $(C_4H_9O)_4Ti$;
tetrabutyl zirconate, $(C_4H_9O)_4Zr$;
zinc propylate, $(C_3H_7O)_2Zn$;
diethyl phenyl aluminum, $(C_2H_5)_2AlC_6H_5$;
diethyl mercury, $(C_2H_5)_2Hg$;
ethyl dimethyl arsenate, $(C_2H_5O)As(O)(OCH_3)_2$;
cyclopentadieneyl sodium, $C_5H_5Na$;
dimethyl sulfate, $(CH_3O)_2SO_2$;
aluminum triisopropyl, $Al(i-C_3H_7)_3$;
diethyl zinc, $(C_2H_5)_2Zn$;
magnesium hydride, $MgH_2$; and
aluminum hydride, $AlH_3$.

Preferably L in the formula above is an alkoxy radical, the integers e and f are 0, and the integer d equals the valence bonds available on M, which is a silicon or aluminum atom.

Particularly preferred as chemical treating agents are tetraalkyl orthosilicates as described in U.S. patent application Ser. No. 343,506, filed Feb. 10, 1964. Examples are octyltrimethyl orthosilicate, $(CH_3O)_3Si(OC_8H_{17})$;
nonyltrimethyl orthosilicate, $(CH_3O)_3Si(OC_9H_{19})$;
decyltripropyl orthosilicate, $(C_3H_7O)_3Si(OC_{10}H_{21})$;
undecyltriethyl orthosilicate, $(C_2H_5O)_3Si(OC_{11}H_{23})$;
dodecyltrimethyl orthosilicate, $(CH_3O)_3Si(OC_{12}H_{25})$;
dodecyltriethyl orthosilicate, $(C_2H_5O)_3Si(OC_{12}H_{25})$;
tridecyltributyl orthosilicate, $(C_4H_9O)_3Si(OC_{13}H_{27}$;

tetradecyl tripropyl orthosilicate, $(C_3H_7O)_3Si(OC_{14}H_{29})$;
hexadecyltriethyl orthosilicate, $(C_2H_5O)_3Si(OC_{16}H_{33})$;
octadecyltrimethyl orthosilicate, $(CH_3O)_3Si(OC_{18}H_{37})$; and
eicosyltrimethyl orthosilicate, $(CH_3O)_3Si(OC_{20}H_{41})$.

The use of tetraalkyl orthosilicates as treating agents for inorganic surfaces is particularly preferred because of the additional benefits derived from their use in addition to the removal of surface hydroxyl groups. The orthosilicates function as dispersing agents in a lactam monomer-inorganic slurry, thus providing a slurry of reduced viscosity for increased ease of casting. The orthosilicates also function as a mold-release agent to increase the ease of separating the mold plates from the polymerized casting. It can therefore be appreciated that a quantity of orthosilicate in excess of the amount necessary to modify an inorganic surface provides further benefits of reinforcing agent dispersion and improved mold-release. This is in sharp contrast to the use of excess initiator to treat an inorganic surface. If the inorganic uses significantly more or less initiator than planned, the excess initiator left over for the polymerization will be increased or decreased accordingly, resulting in substantial variations of the expected molecular weight and resultant variations in physical and mechanical properties.

The above-described organometallic compounds can be used as treating agents in the same manner as coupling agents—either by pre-treating the inorganic prior to its incorporation into a monomer slurry or by adding the compound to the monomer-inorganic mixture.

The tetraalkyl silicates are effective at concentrations as low as 0.01% by weight of the total monomer-inorganic slurry, and can be used in concentrations as high as 2% by weight of the total slurry; preferred concentrations range from about 0.05% to about 1% by weight, usually from 0.1% to about 0.75% by weight of the total slurry.

The most preferred method of treating an inorganic surface to remove substantially all surface hydroxyl groups comprises treating the surface with both a coupling agent and the tetraalkyl orthosilicates. The benefits are many—an inorganic material capable of being chemically bonded to a polylactam is produced; the character of the surface of the inorganic is modified to such an extent that it in no way inhibits the lactam polymerization conducted in its presence; the inorganic is better dispersed in the molten lactam monomer than was formerly possible; and the polymerized composition is easily removed from the mold. FIGURE 3 shows the surface of a wollastonite particle modified in this dual manner so as to provide the multiple benefits described above. The various hydroxyl groups of FIGURE 1 have been altered to form alkoxysilyl groups 31 and aminoalkylsilyl groups 32. The aminoalkylsilyl groups 32 provide polymer coupling capability whereas the alkoxysilyl groups 31 effectively remove the remaining hydroxyl groups. FIGURE 4 is a representation of an inorganic surface showing the various groups available for coupling action and dispersing action.

The invention will be more clearly understood in view of the following examples which set forth several of the techniques used to treat inorganic materials to render them innocuous to a base-catalyzed lactam polymerization.

EXAMPLE 1

A quantity of 350 grams of ε-caprolactam is melted in a flask. To the molten caprolactam is added 680 grams of feldspar which has received no heat pretreatment. Also added to the caprolactam are 6.8 grams of 3-aminopropyltriethoxysilane and 3.5 grams of water. The mixture is heated to about 160° C. under vacuum to remove water and the alcohol formed by hydrolysis of the silane. The distillation is continued until 30 grams of caprolactam are also removed. The vacuum is released to a positive pressure of nitrogen and cooled to 110° or 120° C., at which time 12.3 ml. of a 3-molar solution of ethyl magnesium bromide in ethyl ether is added (equivalent to a catalyst concentration of 13 mmoles/mole of caprolactam). The slurry is then heated to 150° C. and 4.4 grams of toluene diisocyanate (TD-80) is added. The reaction mass is stirred until it gels; the time required in addition to gel time for complete set and cure is very short, e.g. less than a minute. Gel time is 22 minutes.

EXAMPLE 2

The procedure described in Example 1 is followed except that 24.6 ml. of a 3 molar solution of ethyl magnesium bromide in diethyl ether, equivalent to a catalyst concentration of 26 mmoles per mole of caprolactam, is employed. Gel time is ten minutes.

EXAMPLE 3

The procedure described in Example 1 is followed except that 36.9 ml. of a 3 molar solution of ethyl magnesium bromide in diethyl ether, equivalent to a catalyst concentration of 39 mmoles per mole of caprolactam, is employed. Gel time is seven minutes.

EXAMPLE 4

The procedure described in Example 1 is followed except that 0.68 grams of sodium hydride, equivalent to a catalyst concentration of ten mmoles per mole of caprolactam, is employed. Gel time is three minutes.

EXAMPLE 5

A quantity of 350 grams of ε-caprolactam is melted in a flask. To the molten lactam, 680 grams of feldspar which has received no heat pretreatment is added. Also added to the mixture is 6.8 grams of 3-aminopropyltriethoxysilane and 3.5 grams of water. The mixture is heated to about 160° C. under vacuum to distill off excess water and the alcohol formed by hydrolysis of the silane. The distillation is continued until 30 grams of caprolactam is also removed. The vacuum is released to a positive pressure of nitrogen. The slurry is then divided into two equal portions and cooled to about 140° or 150° C. To one portion of the slurry, 0.68 grams of sodium hydride is added. To the second portion of slurry, 4.4 grams of toluene diisocyanate is added. The two slurries are maintained separately at 150° C. for three hours. Upon mixing together at 150° C. the mass gelled after 30 minutes.

EXAMPLE 6

The procedure described in Example 4 is followed except that the feldspar was pretreated at 800° C. for one hour. Gel time was one minute.

EXAMPLE 7

The procedure described in Example 5 was followed except that the feldspar was pretreated at 800° C. for one hour. Gel time was three minutes.

Table I is a summary of Examples 1 to 7 setting forth the variations for purposes of comparison.

TABLE I.—GELATION TIMES FOR FELDSPAR REINFORCED NYLON 6 [1]

| Example No. | Catalyst | Cat. conc. (mmoles/ mole caprolactam) | Feldspar Treatment | Hold Time (hrs.) | Gel Time (min.) |
|---|---|---|---|---|---|
| 1 | EtMgBr | 13 | None | 0 | 22 |
| 2 | EtMgBr | 26 | do | 0 | 10 |
| 3 | EtMgBr | 39 | do | 0 | 7 |
| 4 | NaH | 10 | do | 0 | 3 |
| 5 | NaH | 10 | do | 3 | 30 |
| 6 | NaH | 10 | 800° C | 0 | 1 |
| 7 | NaH | 10 | 800° C | 3 | 3 |

[1] 150° C.; 9 mmoles of toluene diisocyanate per mole of caprolactam; volume fraction feldspar is 0.48.

Increasing the concentration of catalyst increases the rate of reaction as shown in Examples 1 through 3. The concentration of catalyst used in Example 3 is about 10 times the amount that would be required to give a comparable gel time in the absence of feldspar. Comparison of Examples 3 and 4 shows that sodium hydride was a more effective catalyst than ethyl magnesium bromide giving shorter gel times at only 25% of the concentration of the Grignard. Other work indicates that this order of activity is subject to variation depending upon the specific inorganics and initiators used. A comparison of Examples 4 and 5 shows that a considerable loss of catalyst activity occurs in only three hours at 150° C. Examples 6 and 7, respectively equivalent to Examples 4 and 5 in all respects except for the mineral pretreatment, shows that polymerization gel times can be significantly reduced by heat pretreatment of the mineral.

EXAMPLE 8

A quantity of 350 grams of ε-caprolactam is melted in a flask to which is added 700 grams of mullite which has not been heat pretreated. To the mixture is also added 7.0 grams of 3-aminopropyltriethoxysilane and 3.5 grams of water. The mixture is heated to about 160° C. under vacuum to distill off excess water and the alcohol formed by hydrolysis of the silane. The distillation is continued until 50 grams of caprolactam is also removed. The vacuum is released to a positive pressure of nitrogen and cooled to 110° C. or 120° C., at which time 11.5 ml. of a 3 molar solution of ethyl magnesium bromide in diethyl ether, equivalent to 13 mmoles/mole of caprolactam, is added. The slurry is then heated to 150° C. and 4.1 grams of toluene diisocyanate (TD-80) is added. The reaction mixture is stirred until it gels; gel time is 10.5 minutes.

EXAMPLE 9

The procedure described in Example 8 is followed except that the mullite is heated at 800° C. for one hour prior to its incorporation into the monomer system. Gel time is 8.5 minutes.

EXAMPLE 10

The procedure described in Example 8 is followed except that 0.64 grams of sodium hydride catalyst is used in place of the ethyl magnesium bromide. Gel time is 4.4 minutes.

EXAMPLE 11

The procedure described in Example 9 is followed except that 0.64 grams of sodium hydride catalyst is used in place of the ethyl magnesium bromide. Gel time is 1.7 minutes.

EXAMPLE 12

The procedure described in Example 8 is followed except that 10.9 grams of toluene diisocyanate is used instead of the 4.1 grams specified. Gel time is 27.5 minutes.

Table II is a summary of Examples 8 to 12 setting forth the variations therein for purposes of comparison.

TABLE II.—GELATION TIMES FOR MULLITE REINFORCED NYLON 6 [1]

| Example No. | Catalyst | Cat. conc. (mmoles/ mole caprolactam) | Mullite Treatment | Gel Time (Minutes) |
|---|---|---|---|---|
| 8 | EtMgBr | 13 | None | 10.5 |
| 9 | EtMgBr | 13 | 800° C | 8.5 |
| 10 | NaH | 10 | None | 4.4 |
| 11 | NaH | 10 | 800° C | 1.7 |
| 12 | EtMgBr | 13 | None | [2] 27.5 |

[1] 150° C.; 9 mmoles toluene diisocyanate per mole of caprolactam; volume fraction mullite is 0.48; no holding time.
[2] Contains 24 mmoles of toluene diisocyanate per mole of caprolactam Comparison of Examples 1 and 8 show that mullite deactivates the Grignard catalyst considerably less than does feldspar; comparison of Examples 4 and 10 shows the reverse to be true but to a lesser extent, i.e., mullite deactivates the sodium hydride catalyst slightly more than does the feldspar. Although heat pretreatment of the mullite is only slightly effective in reducing gel time of the lactam system using a Grignard catalyst (Examples 8 and 9), the same heat pretreatment appreciably reduces gel time of a sodium hydride catalyzed lactam system (Examples 10 and 11). Example 12 shows that increasing initiator concentration slows down the polymerization.

EXAMPLE 13

A quantity of 350 grams of ε-caprolactam is melted in a flask to which is added 670 grams of wollastonite which has not been heat pretreated. To this mixture is added 6.7 grams of 3-aminopropyltriethoxysilane and 3.5 ml. of water. The mixture is heated to about 160° C. to distill off excess water, alcohol formed by the hydrolysis of the silane, and 20 grams of caprolactam. The vacuum is released to a positive pressure of nitrogen and cooled to 110° or 120° C., at which time 12.6 ml. of a 3 molar solution of ethyl magnesium bromide in diethyl ether, equivalent to 13 mmoles of catalyst per mole of caprolactam is added. The slurry is heated to 150° C. and 4.6 grams of toluene diisocyanate is added and the slurry stirred until it gels; gel time is 39 minutes.

EXAMPLE 14

The procedure described in Example 13 is followed except that the wollastonite is heated at 800° C. for one hour prior to its incorporation into the lactam system. Gel time is 34 minutes.

EXAMPLE 15

The procedure described in Example 13 is followed except that the polymerization is conducted at 200° C. instead of 150° C. Gel time is seven minutes.

EXAMPLE 16

The procedure described in Example 13 is followed except that 0.70 grams of sodium hydride catalyst is used instead of the Grignard. Gel time is 33 minutes.

EXAMPLE 17

The procedure described in Example 14 is followed except that 0.70 grams of sodium hydride catalyst is used instead of the Grignard. Gel time is one minute.

EXAMPLE 18

The procedure described in Example 17 is followed except that the wollastonite is exposed to the atmosphere at room temperature for one week after its heat-pretreatment but before its incorporation into the lactam system. Gel time is four minutes.

Table III is a summary of Examples 13 to 18 set forth in tabular form for purposes of comparison.

TABLE III.—GELATIN TIMES FOR WOLLASTONITE REINFORCED NYLON 6 [1]

| Ex. No. | Catalyst) | Cat. conc. (mmoles/ mole caprolactam) | Polymerization Temperature, ° C. | Wollastonite Treatment | Gel Time (Min.) |
|---|---|---|---|---|---|
| 13 | EtMgBr | 13 | 150 | None | 39 |
| 14 | EtMgBr | 13 | 150 | 800° C | 34 |
| 15 | EtMgBr | 13 | 200 | None | 7 |
| 16 | NaH | 10 | 150 | do | 33 |
| 17 | NaH | 10 | 150 | 800° C | 1 |
| 18 | NaH | 10 | 150 | 800° C [2] | 4 |

[1] 9 mmoles toluene diisocyanate per mole of caprolactam; volume fraction of wollastonite is 0.42; no holding time.
[2] Wollastonite was exposed to atmosphere for 7 days subsequent to heat pretreatment.

As in the case of the mullite, heat treatment of wollastonite in a Grignard catalyzed lactam system had only a slight beneficial effect upon the rate of polymerization (Examples 13 and 14). Increasing the polymerization temperature was very effective in reducing gel times (Examples 13 and 15). Heat-pretreatment of wollastonite was also very effective in a sodium hydride catalyzed lactam system (Examples 16 and 17). Example 18 shows that only a part of the effectiveness of heat-pretreatment is lost if the inorganic is exposed to the air prior to use.

EXAMPLE 19

The procedure described in Example 3 is followed except that the quantity of ethyl magnesium bromide is reduced to 4 mmoles per mole of caprolactam and no feldspar or 3-aminopropyltriethoxysilane are added. Gel time is approximately seven minutes.

EXAMPLE 20

The procedure described in Example 19 is followed except that the catalyst concentration is adjusted to provide 8 mmoles of catalyst per mole of caprolactam. Gel time is six minutes.

TABLE IV.—TREATMENT OF FELDSPAR WITH CATALYST

| Example No. | Cat. conc. (mmoles/mole caprolactam) | Feldspar Content, percent wt. | Gel Time (Min.) |
|---|---|---|---|
| 1 | 13 | 68 | 22 |
| 2 | 26 | 68 | 10 |
| 3 | 39 | 68 | 7 |
| 19 | 4 | 0 | 7 |
| 20 | 8 | 0 | 6 |

Examples 1, 2 and 3 show the reduced polymerization times achieved by using additional catalyst as a treating agent for the feldspar. Comparison of Examples 3 and 19 indicates that approximately 35 mmoles of ethylmagnesium bromide is reacted with the mineral surface. Example 20 indicates that merely increasing the catalyst concentration in the absence of feldspar does not materially affect gelation times. This suggests that most of the reduced gel times shown in Examples 2 and 3 is due not just to the increase in catalyst concentration but mainly to the effect of the catalyst upon the mineral reinforcing agent.

EXAMPLE 21

The procedure described in Example 5 is followed except that only 1.5 grams of toluene diisocyanate is used. Gel time is in excess of one hour.

EXAMPLE 22

The procedure described in Example 5 is followed except that no feldspar and no 3-aminopropyltriethoxysilane are used. Gel time is five minutes.

TABLE V.—TREATMENT OF FELDSPAR WITH INITIATOR

| Example No. | Conc. of Initiator (mmoles/mole capro.) | Feldspar percent wt. | Gel Time (Min.) |
|---|---|---|---|
| 5 | 9 | 68 | 30 |
| 21 | 3 | 68 | ¹ 60 |
| 22 | 9 | 0 | 5 |

¹ Plus.

Comparison of Examples 5 and 21 shows that an increase in initiator concentration can reduce gel times considerably for a caprolactam polymerization carried out in the presence of a reinforcing agent. Gel times obtained in Example 22 indicate that the mineral nevertheless exerts a considerable inhibiting effect on the polymerization at isocyanate concentrations of 9 mmoles per mole of caprolactam.

EXAMPLE 23

The procedure described in Example 1 is followed except that no coupling agent is used. Gel time is one hour.

EXAMPLE 24

The procedure described in Example 1 is followed. In addition, 3.4 grams of tetraethyl orthosilicate is added to the monomer-inorganic slurry along with the coupling agent. Gel time is then minutes.

TABLE VI.—TREATMENT OF MINERAL WITH COUPLERS AND ORTHOSILICATES

| Example No. | Coupler, percent wt. of mineral | Ortho silicate, percent wt. of mineral | Gel Time (Min.) |
|---|---|---|---|
| 23 | 0 | 0 | 60 |
| 1 | 1 | 0 | 22 |
| 24 | 1 | 0.5 | 10 |

The above examples show the reduced gel times achieved by the use of coupling agent alone and the use of coupling agent plus orthosilicate.

EXAMPLE 25

A quantity of 400 grams of ε-caprolactam is melted in a flask to which is added 650 grams of wollastonite. Also added are 12.3 ml. of a 3 molar solution of ethyl magnesium bromide in ethyl ether. A vacuum is applied to the slurry and the slurry heated to 160° C. to remove 50 grams of caprolactam and volatile reaction products. The slurry is then cooled to 150° C. and 4.4 grams of toluene diisocyanate added. The reaction mass is stirred until it gels; gel time is one hour.

EXAMPLE 26

The procedure described in Example 25 is followed. In addition, 4 grams of aluminum ethoxide are added to the slurry prior to addition of the catalyst. Gel time is less than 30 minutes.

EXAMPLE 27

The procedure described in Example 26 is followed except that 4.5 grams of magnesium hydride is used in place of the aluminum exthoxide. Gel time is less than 30 minutes.

EXAMPLE 28

The procedure described in Example 26 is followed except that 4 grams of dimethyl phenylphosphonate is used in place of the aluminum ethoxide. Gel time is less than 30 minutes.

EXAMPLE 29

The procedure described in Example 26 is followed except that 3.8 grams of dimethyl sulfate is used in place of the aluminum ethoxide. Gel time is less than 30 minutes.

EXAMPLE 30

The procedure described in Example 26 is followed except that 4 grams of zinc diethyl is used in place of the aluminum ethoxide. Gel time is less than 30 minutes.

Although the invention has been described in terms of specified embodiments which are set forth in considerable detail, it should be understood that this was done for illustrative purposes only, and that the invention is not necessarily limited thereto since alternative embodiments and operating techniques will become apparent to those skilled in the art in view of this disclosure. For instance, the treatments discussed herein for filler and reinforcing agent surfaces are usually described as applicable to inorganic materials. It should nevertheless be understood that all the methods presented as applicable to inorganic materials are equally applicable to organic fillers such as wood fibers or cotton floc, although in some instances it may be advisable to reduce the extent of the treatment somewhat. As an example, surface hydroxyl groups can be removed from wood fibers by heating at 100° or 150° C. for an hour or two. Accordingly, these and other modifications are contemplated which can be made without departing from the spirit of the described invention.

The following examples demonstrate the advantages of using an isocyanate initiator as a chemical treating agent followed by addition of a polyurethane catalyst prior to introduction of a lactam polymerization catalyst.

EXAMPLE 31

A quantity of 1200 parts of ε-caprolactam is melted prior to addition of 1950 parts of wollastonite to the caprolactam. To this mixture are added 19 parts of 3-aminopropyltriethoxysilane and 54 parts of water. The slurry is stirred and heated to 160° C. under a vacuum to remove excess water and alcohol from hydrolysis of the silane. The vacuum distillation is continued to remove 150 parts of caprolactam. The vaccum is replaced with a positive pressure of nitrogen and the slurry cooled to about 110° C., at which time 1.5 parts of toluene diisocyanate and 2 parts of triethylenediamine are added. The slurry is then held for 20 hours at 100° to 110° C., after which time two parts of sodium hydride is added. A vacuum is applied to remove evolved gases and the slurry is heated rapidly to 200° C. and cast into a mold preheated to 200° C. Polymerization is complete within two minutes; the finished product is entirely free from bubble formation.

EXAMPLE 32

The procedure in Example 31 is followed exactly except that triethylenediamine is not used. The resultant polymerization requires more than 30 minutes and the finished product contains many bubble spaces.

EXAMPLE 33

The procedure described in Example 31 is followed except that the triethylenediamine is added after the 20-hour holding period. After allowing sufficient time for the gas evolution, 2 parts of sodium hydride is added. Polymerization is complete within two minutes and the finished product is free from bubble formation.

EXAMPLE 34

The procedure described in Example 31 is followed except that 8.7 parts of bismuth nitrate, $Bi(NO_3)_3 \cdot 5H_2O$, is used instead of the triethylenediamine. Polymerization is complete in less that five minutes and the finished product is entirely free from bubble formation.

EXAMPLE 35

The procedure described in Example 31 is followed except that 13.9 parts of lead oleate is used instead of the triethylendiamine. Polymerization is complete in less than five minutes and the finished product is entirely free from bubble formation.

EXAMPLE 36

The procedure described in Example 31 is followed except that 1.7 parts of sodium propionate is used instead of the triethylenediamine. Polymerization is complete in less than five minutes and the finished product is entirely free from bubble formation.

EXAMPLE 37

The procedure described in Example 31 is followed except that 5.1 parts of butyltin trichloride is used instead of the triethylenediamine. Polymerization is complete in less than five minutes and the finished product is entirely free from bubble formation.

EXAMPLE 38

The procedure described in Example 31 is followed except that 4.7 grams of stannic chloride is used instead of the triethylenediamine. Polymerization is complete in less than five minutes and the finished product is entirely free from bubble formation.

EXAMPLE 39

The procedure described Example 31 is followed except that 7.3 parts of stannous octoate is used instead of the triethylenediamine. Polymerization is complete in less that five minutes and the finished product is entirely free from bubble formation.

EXAMPLE 40

The procedure described in Example 31 is followed except that 4.9 parts of ferric chloride, $FeCl_3 \cdot 6H_2O$, is used instead of the triethylenediamine. Polymerization is complete in less than five minutes and the finished product is entirely free from bubble formation.

EXAMPLE 41

The procedure described in Example 31 is followed except that 4.1 parts of antimony trichloride is used instead of the triethylenediamine. Polymerization is complete in less than five minutes and the finished product is entirely free from bubble formation.

EXAMPLE 42

The procedure described in Example 31 is followed except that 2 parts of N-ethylethylenimine is used instead of the triethylenediamine. Polymerization is complete in less than five minutes and the finished product is entirely free from bubble formation.

EXAMPLE 43

The procedure described in Example 31 is followed except that 4.7 parts of triphenyl aluminum is used instead of the triethylenediamine. Polymerization is complete in less than five minutes and the finished product is entirely free from bubble formation.

What is claimed is:

1. In a process for conducting a base-catalyzed, substantially anhydrous lactam polymerization in the presence of a filler or reinforcing agent having hydroxyl groups present on its surface, said filler or reinforcing agent being present in a quantity sufficient to provide a finished composition containing from about 5 to about 95% by weight of said filler or reinforcing agent, the improvement comprising using sufficient catalyst both to react with substantially all said hydroxyl groups and to catalyze the polymerization in combination with an organosilane of the formula

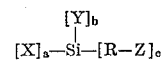

where X is an inorganic-reactive group, Y is a non-reactive group, Z is a group capable of incorporation into a growing polylactam chain, R is an alkylene or alkenylene chain of from 2 to about 20 carbon atoms, $a$ is an integer from 1 to 3, $b$ is an integer from 0 to 2, $c$ is an integer from 1 to 3, and the sum of $a+b+c$ is 4.

2. A process according to claim 1 wherein said filler or reinforcing agent is a siliceous mineral having a melting point above about 800° C., a Moh's hardness of at least 4, and a water solubility of less than 0.1 gram per liter.

3. A process according to claim 1 wherein said catalyst is an alkyl magnesium halide.

4. A process according to claim 1 wherein said catalyst is sodium hydride.

5. A process for preparing reinforced polylactam compositions comprising (a) combining under conditions incapable of causing rapid polymerization of the lactam monomer, siliceous mineral having a 3-dimensional crystal structure, a melting point above about 800° C., a Moh's hardness of at least 4, and a water solubility of less than 0.1 gram per liter, said mineral being present in a quantity sufficient to provide a finished composition containing from about 5 to about 95% by weight of said mineral; coupling agent of the formula

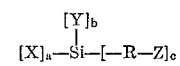

where X is an inorganic-reactive group, Y is a nonreactive group, Z is a group capable of incorporation into a growing polylactam chain, R is an alkylene or alkenylene chain of from 2 to about 20 carbon atoms, $a$ is an integer from 1 to 3, $b$ is an integer from 0 to 2, $c$ is an integer from 1 to 3, and the sum of $a+b+c$ is 4; sufficient basic lactam polymerization catalyst both to react with substantially all the hydroxyl groups present on the surface of said siliceous mineral and to catalyze the polymerization; and lactam polymerization initiator; and (b) heating the mixture formed thereby under substantially anhydrous conditions at a temperature from about the melting point of said lactam up to about 250° C. for a time sufficient to cause polymerization.

6. A process according to claim 5 wherein said lactam is ε-caprolactam.

7. In a process for conducting a base-catalyzed, substantially anhydrous lactam polymerization in the presence of a filler or reinforcing agent having hydroxyl groups present on its surface, said filler or reinforcing agent being present in a quantity sufficient to provide a finished composition containing from about 5 to about 95% by weight of said filler or reinforcing agent, the improvement comprising adding a compound of the formula

where L is selected from the group consisting of hydrogen, alkyl and alkoxy radicals having up to 6 carbon atoms, M is boron, sodium, magnesium, aluminum, sulfur, titanium, zinc, arsenic, zirconium, tin or mercury, R is any hydrocarbon radical, the integer $d$ is at least 1, and the sum of $d+2e+f$ equals the valence bonds attached to the M atoms, to a monomer-inorganic slurry prior to the start of the polymerization.

8. A process according to claim 7 wherein as an additional additive a coupling agent of the formula

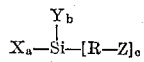

where X is an inorganic-reactive group, Y is a non-reactive group, Z is a group capable of incorporation into a growing polylactam chain, R is an alkylene or alkenylene chain of from 2 to about 20 carbon atoms, $a$ is an integer from 1 to 3, $b$ is an integer from 0 to 2, $c$ is an integer from 1 to 3 and the sum of $a+b+c$ equals 4, is added to the monomer-inorganic slurry prior to the start of a polymerization.

9. A process according to claim 8 wherein said coupling agent is 3-aminopropyltrialkoxysilane.

10. A process according to claim 8 wherein said coupling agent is alkyl-11-trialkoxysilylundecanoate.

11. A process according to claim 7 wherein said compound is selected from the group consisting of mono-, di-, and trialkoxy aluminum compounds.

12. A process according the claim 7 wherein said compound is aluminum ethylate.

References Cited

UNITED STATES PATENTS

| 3,166,533 | 1/1965 | Wichterle et al. | 260—78 |
| 1,332,806 | 6/1963 | France | 260—37 |

FOREIGN PATENTS

| 97,333 | 11/1960 | Czechoslovakia. |
| 98,168 | 1/1961 | Czechoslovakia. |
| 694,410 | 9/1964 | Canada. |

OTHER REFERENCES

Ralph K. Iller, "The Colloid Chemistry of Silica and Silicates," Cornell U. Press, Ithaca N.Y., 1955, pp. 233–37, 255, 257.

MORRIS LIEBMAN, *Primary Examiner.*

J. E. CALLAGHAN, *Examiner.*